US008089903B2

(12) United States Patent
Leef et al.

(10) Patent No.: US 8,089,903 B2
(45) Date of Patent: Jan. 3, 2012

(54) METHOD AND APPARATUS FOR PROVIDING A LOGICAL SEPARATION OF A CUSTOMER DEVICE AND A SERVICE DEVICE CONNECTED TO A DATA STORAGE SYSTEM

(75) Inventors: Phillip Leef, Brookline, MA (US); Douglas Sullivan, Hopkinton, MA (US); Matthew Ferson, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 700 days.

(21) Appl. No.: 11/394,943

(22) Filed: Mar. 31, 2006

(65) Prior Publication Data
US 2007/0237158 A1    Oct. 11, 2007

(51) Int. Cl.
*H04L 12/28* (2006.01)
*H04L 12/56* (2006.01)
(52) U.S. Cl. .................................. 370/254; 370/395.5
(58) Field of Classification Search .................. None
See application file for complete search history.

(56) References Cited

U.S. PATENT DOCUMENTS

| | | | |
|---|---|---|---|
| 5,283,792 A | 2/1994 | Davies et al. | 714/22 |
| 5,774,640 A | 6/1998 | Kurio et al. | 714/4 |
| 5,935,261 A | 8/1999 | Blachek et al. | |
| 6,633,905 B1 | 10/2003 | Anderson et al. | 709/219 |
| 6,651,154 B1 * | 11/2003 | Burton et al. | 711/202 |
| 6,678,639 B2 | 1/2004 | Little et al. | 702/188 |
| 6,681,282 B1 | 1/2004 | Golden et al. | 710/302 |
| 6,728,908 B1 | 4/2004 | Fukuhara et al. | |
| 6,873,268 B2 | 3/2005 | Lebel et al. | 340/870.16 |
| 6,910,148 B1 | 6/2005 | Ho et al. | 714/4 |
| 7,039,737 B1 | 5/2006 | Dorr et al. | 710/240 |
| 7,130,900 B2 * | 10/2006 | Shiga et al. | 709/223 |
| 2003/0055968 A1 | 3/2003 | Hochmuth et al. | 709/226 |
| 2003/0105859 A1 * | 6/2003 | Garnett et al. | 709/224 |
| 2004/0028068 A1 * | 2/2004 | Kizhepat | 370/420 |

(Continued)

FOREIGN PATENT DOCUMENTS
WO    WO 2005076120 A1 *    8/2005

OTHER PUBLICATIONS

The SunFire B100x and B200x Server Blade Installation and Setup Guide (The Guide) (Author Unknown, SunFire B100x and B200x Server Blade Installation and Setup Guide, Sun Microsystems, Mar. 2004, pp. 1 and 7-1 to 7-36.*

(Continued)

*Primary Examiner* — Daniel J Ryman
*Assistant Examiner* — Christopher Crutchfield
(74) *Attorney, Agent, or Firm* — BainwoodHuang

(57) ABSTRACT

A data storage system includes storage array and a switch that is configurable to create numerous network topologies within the system and to maintain separate communications paths between different computerized devices or networks and the storage array. For example, a user device and a service device, such as a system diagnosis device, can connect to the storage array through the switch. In order to isolate interaction or communication between the user and service devices, the switch can be logically partitioned into two distinct switches to form two distinct, isolated communications paths between the devices and the storage array. With isolated communications pathways established in the switch, in use, the service device is unable to access the user device coupled to the storage array.

11 Claims, 7 Drawing Sheets

U.S. PATENT DOCUMENTS

| | | | |
|---|---|---|---|
| 2004/0068561 A1* | 4/2004 | Yamamoto et al. | 709/224 |
| 2005/0044199 A1* | 2/2005 | Shiga et al. | 709/223 |
| 2005/0114474 A1* | 5/2005 | Anderson et al. | 709/220 |
| 2005/0154841 A1 | 7/2005 | Sastri et al. | |
| 2005/0182906 A1* | 8/2005 | Chatterjee et al. | 711/144 |
| 2006/0007491 A1 | 1/2006 | Kanda et al. | 358/1.16 |

OTHER PUBLICATIONS

Author Unknown, SunFire B100x and B200x Server Blade Installation and Setup Guide, Sun Microsystems, Mar. 2004, pp. 1 and 7-1 to 7-36.*

Author Unknown, Using Proliant Essentials Rapid Deployment Pack for Scripted Blade-Based Switch Configuration, pp. 1-23, Sep. 2003.*

Written Opinion of the International Searching Authority, mailed Apr. 13, 2007, (8 pages).

D'Antonio, S., et al., "An Architecture for Automatic Configuration of Integrated Networks," Network Operations and Management Symposium, 2004, NOMS 2004, IEEE/IFIP, Seoul, Korea Apr. 19-23, 2004, Piscataway, NJ, USA, 2004, IEEE, vol. 1, Apr. 19, 2004, (pp. 351-364).

Hangai, Akira, "Project MegaGrid: Building the Oracle Grid Reference Achitecture,", EMC Corporation,: (online) 2005, as retrieved from the Internet: URL:http://regions.cmg.org/regions/kccmg/Impact2005/ProjectMegaGridTechnical_20050930.ppt, Mar. 28, 2007, (pp. 1-49).

Data Sheet: EMC CLARiiON CX Series, EMC Corporation, 2004, 8 pages.

http://www.storagesearch.com/fchub.html, "The Shift to NAS Gateways," visited Aug. 17, 2006, 4 pages.

* cited by examiner

METHOD AND APPARATUS FOR PROVIDING A LOGICAL SEPARATION OF A CUSTOMER DEVICE AND A SERVICE DEVICE CONNECTED TO A DATA STORAGE SYSTEM

CROSS REFERENCE TO RELATED APPLICATIONS

This application is related to U.S. patent application Ser. No. 11/394,919, filed on Mar. 31, 2006, entitled "METHOD AND APPARATUS FOR DETECTING THE PRESENCE OF ERRORS IN DATA TRANSMITTED BETWEEN COMPONENTS IN A DATA STORAGE SYSTEM USING AN I2C PROTOCOL", the contents and teachings of which are hereby incorporated by reference in their entirety.

BACKGROUND

A typical data storage system stores and retrieves data for one or more external host devices (or simply hosts). Such a data storage system typically includes processing circuitry and a set of disk drives. In general, the processing circuitry performs load and store operations on the set of disk drives on behalf of the hosts. For example, conventional processing circuitry includes one or more ports, such as Ethernet ports, that allow the host devices to connect to the processing circuitry in order to exchange data with the disk drives.

On occasion, the data storage system may require servicing by a technician. To this end, the technician typically goes to the location where the data storage system resides and performs a service procedure on the data storage system. For example, the system may require a hardware or software upgrade in order to integrate a design improvement or to fix a design defect. As another example, a circuit board of the processing circuitry or a disk drive may fail and require replacement.

Prior to servicing the data storage system, the technician typically connects a service device, such as a portable computer, to the system in order to perform a system diagnosis. In certain cases, the data storage system includes a single access port dedicated to host access of the storage system. Therefore, in order to diagnose the storage system the service technician must disconnect the host connection from the port and connect the service device to the storage system through the port. In other cases, the data storage system includes two access ports: a host port dedicated for connection to host devices and a service port dedicated for technician access to the data storage system. In these systems, the technician can connect the service device to the service port to perform a diagnosis of the storage system.

SUMMARY

As indicated above, conventional data storage systems typically include one or more ports that provide a technician with direct access to the system, via a portable computer, in order to diagnose and service the systems. There are, however, deficiencies with the configuration of conventional data storage systems with respect to providing technician access. For example, as indicated above, certain storage systems provide only a single port for access by either a host device or a service device. In such a case, in order to diagnose the data storage system, a technician must disconnect the host device from the port and connect the service device to the storage system through the port. Such a process disrupts the host device's access to the storage system.

In another example, also as indicated above, the data storage system includes two access ports: a host port dedicated for connection to host devices and a service port dedicated for technician access to the data storage system. However, the ports do not typically include any type of security mechanisms to prevent communications from occurring between devices attached to the ports. As a result, the service device connected to the service port can access the host device or a network of host devices connected to the host port. In such a case, when the technician connects the service device to the service port to perform a diagnosis of the storage system, the service device can potentially gain unauthorized access to data stored on the host devices or introduce a computer virus to the host devices. Based upon the typical configuration of the host and service ports, while a service device can be used to service the storage system, it can also potentially disrupt operation of the host devices.

By contrast to conventional powered devices, embodiments of the invention are directed to a method and apparatus for providing a logical separation of a customer device and a service device connected to a data storage system. A data storage system includes storage array and a switch that is configurable to create numerous network topologies within the system and to maintain separate communications paths between different computerized devices or networks and the storage array. For example, a user device and a service device, such as a system diagnosis device, can connect to the storage array through the switch. In order to isolate interaction or communication between the user and service devices, the switch can be logically partitioned into two distinct switches to form two distinct, isolated communications paths between the devices and the storage array. With isolated communications pathways established in the switch, in use, the service device is unable to access the user device coupled to the storage array. As such, the isolated communications pathways limit or prevent the service device from accessing data stored on the user device or from spreading potentially malicious data or files, such as computer viruses to the user device.

In one embodiment, the invention relates to a method of forming a communication pathway with a storage array in a communications management device. The method includes connecting a switch of the communications management device with a storage processor of the storage array, the storage processor having a management port and a service port, the management port configured to provide a first device with access to the storage array and the service port configured to provide a second device with access to the storage array. The method also includes configuring a virtual local area network of the switch to establish a first communications path of the switch and a second communications path of the switch, the first communications path being isolated form the second communications path. The method further includes conveying data between (i) a first port of the communications management device and at least one of the management port and the service port of the storage processor using the first communications path and (ii) a second port of the communications management device and at least one of the management port and the service port of the storage processor using the second communications path. The presence of the communications paths allows both user devices and service devices to access the storage array while minimizing or spreading of potentially malicious data or files, such as computer viruses, between the devices.

In one arrangement, a communications management device includes a first port, a second port, a switch electrically coupled to the first port and the second port, and a controller electrically coupled to the switch. The controller of the communications management device is configured to connect the switch of the communications management device with a storage processor of the storage array where the storage processor includes a management port and a service port, the management port configured to provide a first device with access to the storage array and the service port configured to provide a second device with access to the storage array. The controller is further operable to configure a virtual local area network of the switch to establish a first communications path of the switch and a second communications path of the switch, the first communications path being isolated form the second communications path. The first communications path is operable to convey data between the first port of the communications management device and at least one of the management port and the service port of the storage processor and the second communications path is operable to convey data between the second port of the communications management device and at least one of the management port and the service port of the storage processor.

In one arrangement, a data storage system includes a storage array having a storage processor and a communications management device. The storage processor includes a management port and a service port where the management port is configured to provide a first network with access to the storage array and the service port is configured to provide a second network with access to the storage array. The communications management device includes a first port, a second port, a switch electrically coupled to the first port and the second port, and a controller electrically coupled to the switch. The controller is operable to connect the switch of the communications management device with the storage processor of the storage array. The controller is further operable to configure a virtual local area network of the switch to establish a first communications path of the switch and a second communications path of the switch, the first communications path being isolated form the second communications path. The first communications path is operable to convey data between the first port of the communications management device and at least one of the management port and the service port of the storage processor. The second communications path is operable to convey data between the second port of the communications management device and at least one of the management port and the service port of the storage processor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to a method and apparatus for providing a logical separation of a customer device and a service device connected to a data storage system. A data storage system includes storage array and a switch that is configurable to create numerous network topologies within the system and to maintain separate communications paths between different computerized devices or networks and the storage array. For example, a user device and a service device, such as a system diagnosis device, can connect to the storage array through the switch. In order to isolate interaction or communication between the user and service devices, the switch can be logically partitioned into two distinct switches to form two distinct, isolated communications paths between the devices and the storage array. With isolated communications pathways established in the switch, in use, the service device is unable to access the user device coupled to the storage array. As such, the isolated communications pathways limit or prevent the service device from accessing data stored on the user device or from spreading potentially malicious data or files, such as computer viruses to the user device.

Figure 1:
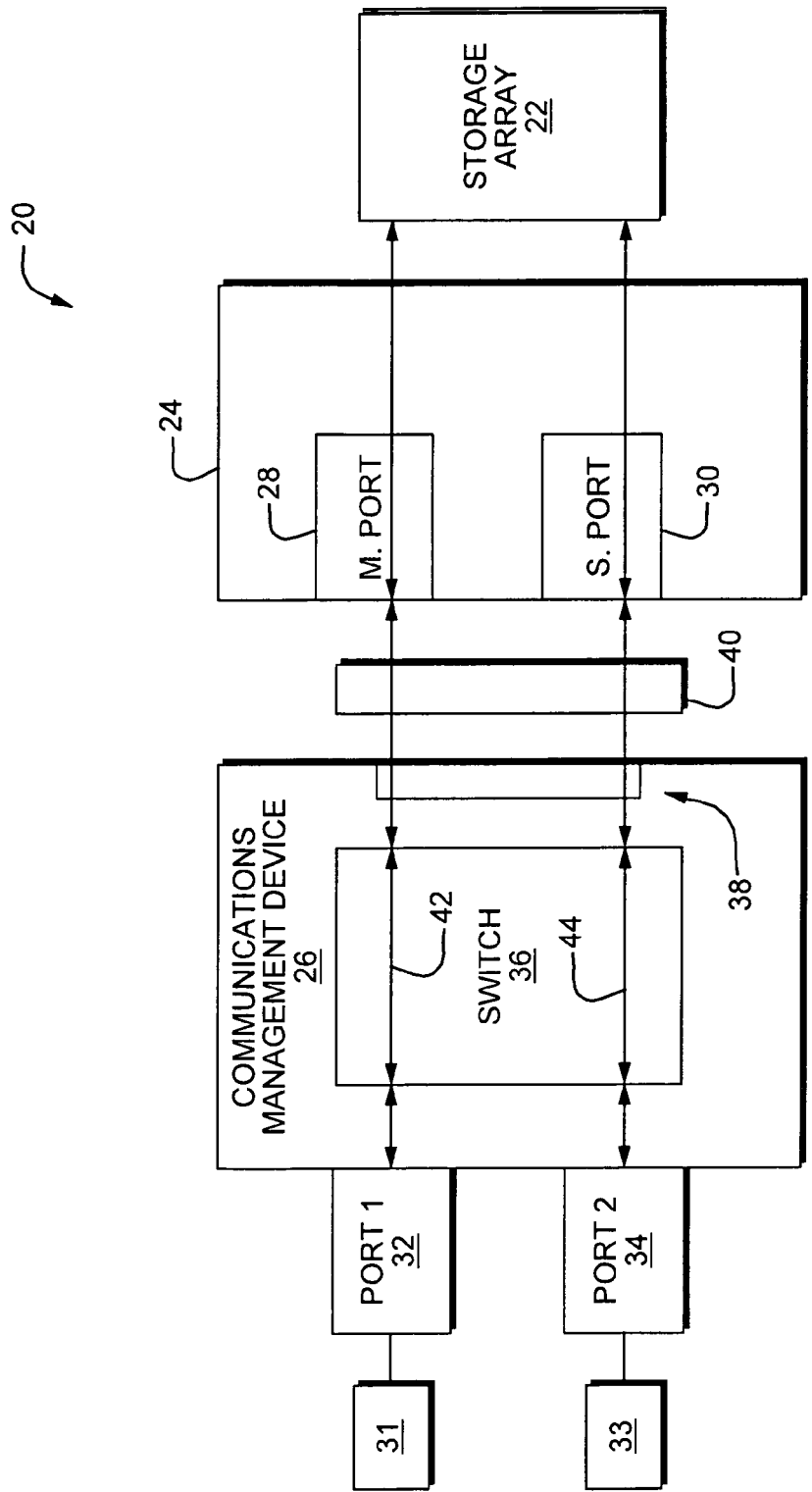
FIG. 1 illustrates a schematic representation of a data storage system, according to one embodiment of the invention.

FIG. 1 illustrates an arrangement of a data storage system 20. The system 20 includes a data storage array 22 (e.g., a configuration of magnetic disk drives) having a storage processor 24 and a communications management device 26 coupled to the storage processor 24. The storage array 22 is configured to store and retrieve data for one or more external devices. In one arrangement, the storage array 22 is configured as a storage area network (SAN) that includes a collection of storage arrays 22 that are networked with each other and with a number of computer systems. The SAN operates as a server to serve data stored in the storage arrays 22 to end-user computers or systems. In one arrangement, the storage array 22 includes a network attached storage (NAS) device, such as a gateway or a server, which forms a front-end to the storage array 22.

The storage processor 24 is configured to perform load and store operations on the storage array 22 on behalf of the external devices. The storage processor 24 is also configured to provide the external devices, such as user devices 31 and service devices 33, access to the storage array 22. In one arrangement, the storage processor 24 includes a management port 28 and a service port 30. In use, a user device 31 utilizes the management port 28 to load and store data relative to the storage array 22 while a service device 33 utilizes the storage port 30 to diagnose and service the storage array 22. One of ordinary skill in the art will understand that the user device 31 can be a stand alone computer device or a data communications device, such as a router or switch, which allows connection of multiple computerized devices to the storage processor 24.

The communications management device 26 is configured to isolate interaction or communication between the user and service devices 31, 33 when coupled to the storage array 22. In one arrangement, the communications management device 26 includes a first port 32, a second port 34, and a switch 36 electrically coupled to the first and second ports 32, 34. In one arrangement, each of the ports 32, 34 is configured as an Ethernet port, such as an RJ45 port, to allow connection of a user device or network 31 and a service device or network 33 to the communications management device 26 using a cable, such as a twisted-pair Ethernet cable.

The switch 36, such as a Broadcom 532E 10/100Base-T/TX Ethernet switch is configured to electrically couple the ports 32, 34 of the device 26 to the ports 28, 30 of the storage processor 24 through an electrical connection 38. For example, the communications management device 26 can include a midplane connector 38, such as a Metral series connector distributed by FCI (FCI, France), that couples to the storage processor 24 through a midplane 40. In such an arrangement, the communications management device 26 is configured as a field replaceable unit (FRU) that can be electrically coupled to, or decoupled from, the storage array 22.

In order to isolate interaction or communication between the user and service devices 31, 33, in one arrangement, a software algorithm configures a virtual local area networks (VLAN) associated with the switch 36 to create two distinct, isolated communications paths 42, 44. For example, as illustrated in FIG. 1, the first communications path 42 allows communication between a user device 31 coupled to the first port 32 and the management port 28 of the storage processor 24 while the second communications path 44 allows communication between a service device 33 coupled to the second port 32 and the service port 30 of the storage processor 24. The use of separate isolated communications paths 42, 44 minimizes or prevents the device 33 coupled to the second port 34 from accessing the device 31 coupled to the first port 32 and vice versa. The switch 36 in this configuration, therefore, provides a level of security to the devices 31, 33 coupled to the storage array 22 and minimizes the exchange of potentially damaging files, such as computer viruses, between the devices 31, 33.

Figure 2:
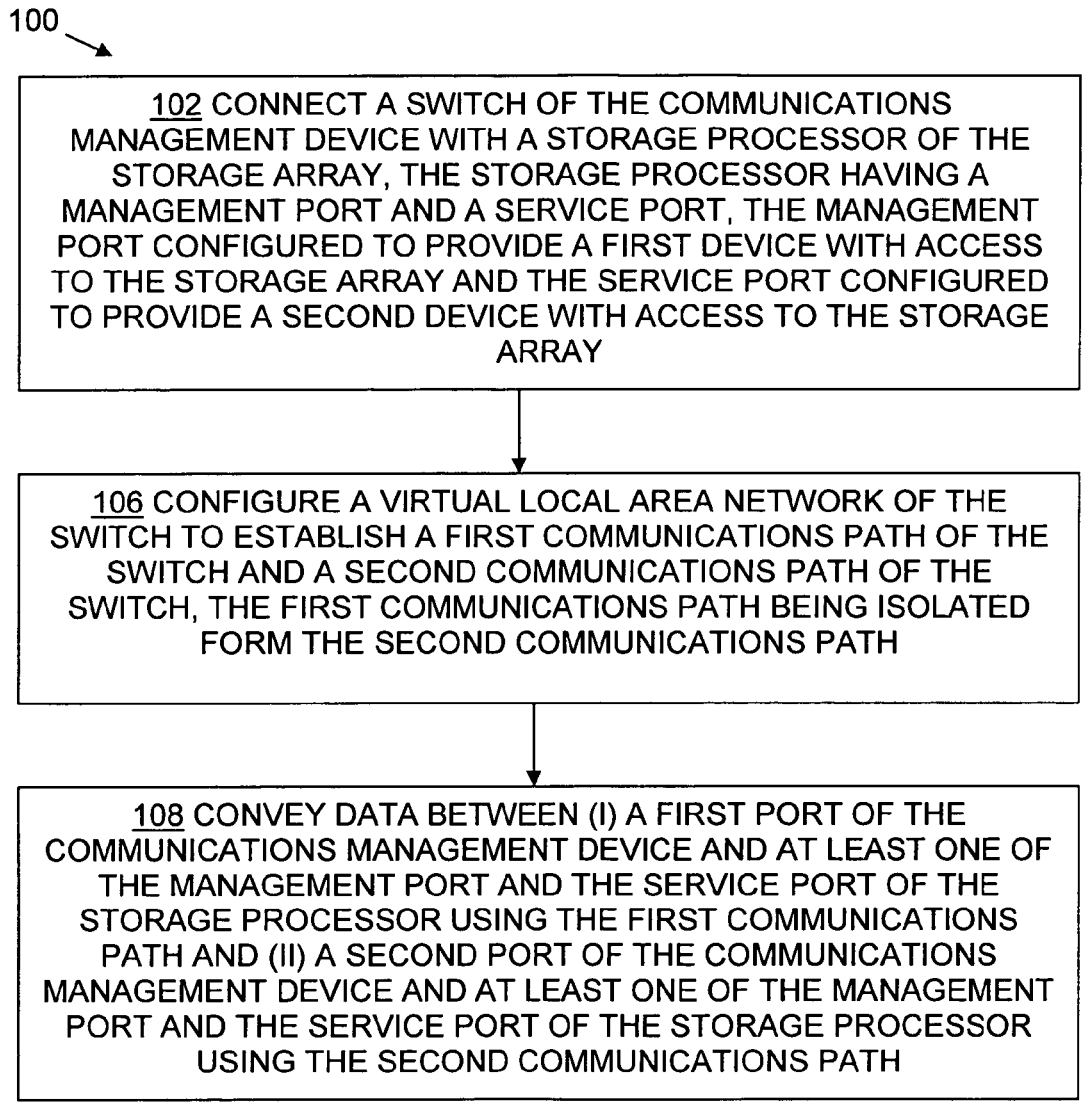
FIG. 2 is a flowchart that illustrates a procedure performed by a communication management device of FIG. 1, according to one embodiment of the invention.

FIG. 2 shows a procedure 100 describing operation of the communications management device 26.

In step 102, the communications management device 26 connects the switch 36 of the communications management device 26 with the storage processor 24 of the storage array 22, the storage processor 24 having the management port 28 and the service port 30, the management port 28 configured to provide a first device 31 with access to the storage array 22 and the service port 30 configured to provide a second device 33 with access to the storage array 22. In one arrangement, when the communications management device 26 physically couples to the storage processor 24, the connection between the switch 36 and the storage processor can be formed as a result of an exchange of network addresses between the communications management device 26 and the storage processor 24 in an autonegotiation procedure.

In step 104, the communications management device 26 configures a virtual local area network of the switch 36 to establish a first communications path 42 of the switch 36 and a second communications path 44 of the switch 36, the first communications path 42 being isolated form the second communications path 44. By partitioning the switch 36 into two separate, logical switches, the communications management device 26 effectively isolates the first port 32 and the first network 31 from the second port 34 and the second network 33. In one arrangement, the communications management device 26 establishes the first and second communications paths 42, 44 on the switch 36 utilizing a software application, as will be described below. However in another arrangement, the switch 36 can be configured in hardware, such as by a manufacturer of the switch 36 to establish the first and second communications paths 42, 44.

In step 106, the communications management device 26 conveys data between the first port 32 of the communications management device 26 and at least one of the management port 28 and the service port 30 of the storage processor 24 using the first communications path 42 and between a second port 34 of the communications management device 26 and at least one of the management port 28 and the service port 30 of the storage processor 24 using the second communications path 44. For example, as illustrated in FIG. 1, the communications management device 26 has configured the VLAN of the switch 36 such that the switch 26 forms the first communications path 42 between the first port 32 and the management port 28 of the storage processor 24 and forms the second communications path 44 between the second port 34 and the service port 30 of the storage processor 24. However, the communications management device 26 can configure the VLAN of the switch 36 in any number of ways. For example, the communications management device 26 can configure the VLAN of the switch to form a first communications path 42 between the first port 32 and the service port 30 of the storage processor 24 and a second communications path 44 between the second port 34 and the management port 28 of the storage processor 24.

By maintaining separate isolated communications paths 42, 44 in the switch 26, the communications management device 26 allows the connection of a service device 33 to the storage array 22 to provide diagnosis and service functions while providing a level of security to an attached user device 31. For example, with separate communications paths 42, 44 established in the switch 36 between the first and second ports 32, 34, when a technician attaches a service device 33 to the second port 34, the service device 33 is unable to detect the presence of, or access, the user device 31 coupled to the first port 32 through the storage processor 24. As such, the separate communications paths 42, 44 limit or prevent the service device 33 from accessing data stored on the user device 31 and from spreading potentially malicious data or files, such as computer viruses to the user device 31.

As indicated above, the VLAN of the switch 36 can be configured to create various network topologies within the system 20 in order to maintain separate communications paths between different computerized devices or networks 31, 33 coupled to the storage array 22. It should be understood that the switch 36 can be configured using a number of different mechanisms. For example, in one arrangement, an external controller, such as the storage processor 24 is operable to configure the VLAN of the switch 36. In another arrangement, the communications management device 26 includes a local controller (e.g., disposed on the same circuit board as the switch 36) used to configure the VLAN. The local controller provides the communications management device 26 with a level of functionality separate from the functionality storage processor 24 or storage array 22. Description of the communications management device 26 having such a controller is provided below.

Figure 3:
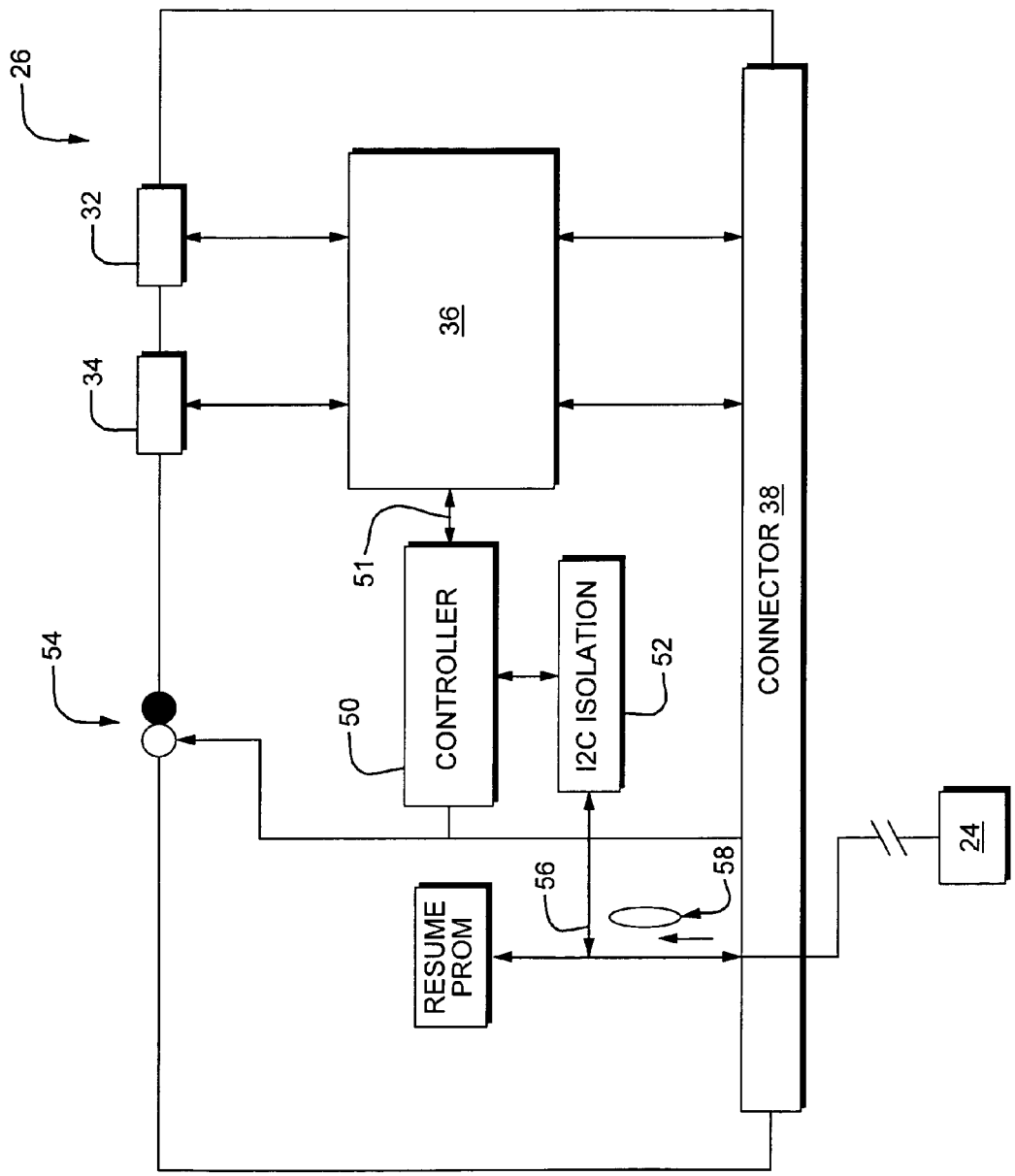
FIG. 3 illustrates a schematic representation of the communication management device of FIG. 1, according to one embodiment of the invention.

FIG. 3 illustrates an arrangement of the communications management device 26 having a controller 50 electrically coupled to the switch 36 via interface 51, such as a four-wire serial peripheral interface (SPI). The controller 50 is operable to perform configuration and diagnostics operations with respect to the switch 36 and to control a set of status indicators 54, such as light emitting diodes, associated with the communications management device 26. In one arrangement, the controller 50 is a Cypress Microcontroller model number CY8C27443, distributed by Cypress Semiconductor Corporation. As illustrated, the controller 50 includes an I2C switch (e.g., isolation module) 52 that allows for electrical communication between the controller 50 and the storage processor 24 over an I2C bus 56 and that isolates the controller 50 from the bus 56 (e.g., in the event that the controller 50 holds ether the data or clock lines low). In one arrangement, the I2C switch 52 is a Philips PCA9546 I2C switch, distributed by Philips Semiconductors.

The controller 50, in one arrangement, is operable to configure the VLAN on the switch 36 based upon the requirements of the storage array 22 (FIG. 1). For example, when the controller 50 electrically couples to the storage processor 24, the controller 50 detects a configuration characteristic 58 of the storage array 22 where the configuration characteristic 58 indicates a particular configuration of the storage array 22. For example, as indicated above, the storage array 22 can be configured as a storage area network (SAN) or can be configured to include a network attached storage (NAS) device, such as a gateway or a server, which forms a front-end to the storage array 22. The configuration characteristic 58, therefore, allows the controller 50 to detect the "type" of storage array 22 to which it is connected and allows the controller 50 to configure the switch 50 to provide certain communication pathways 42, 44 between the first and second ports 32, 34 of the communications management device 26 and the management and service ports 28, 30 of the storage processor 24 based upon the storage array "type."

Figure 4:
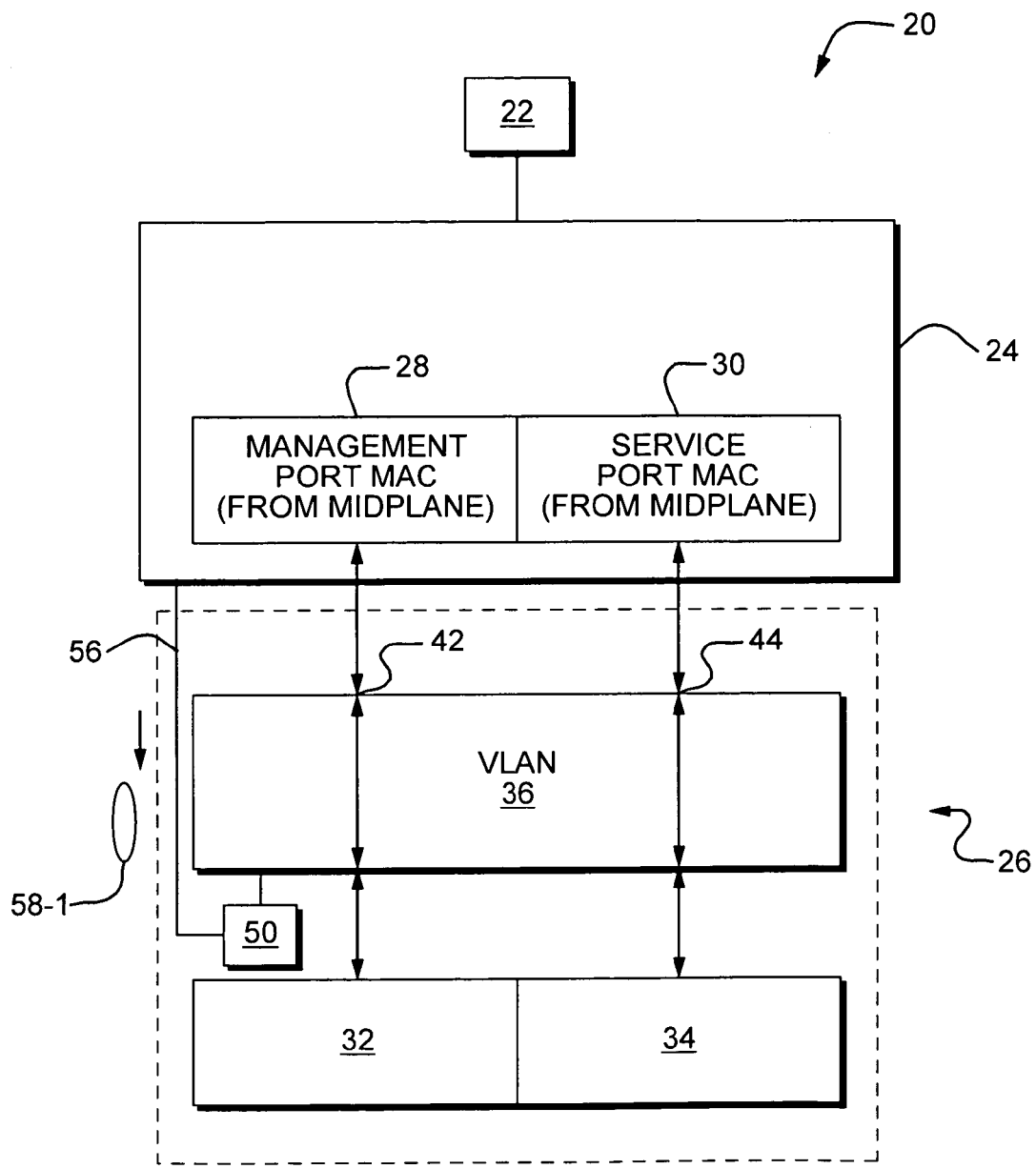
FIG. 4 illustrates a configuration of the communication management device of FIG. 3 when electrically coupled to a storage area network (SAN), according to one embodiment of the invention.

FIG. 4 illustrates an arrangement of the data storage system 20 where the storage array 22 is configured as part of a SAN. In such an arrangement, when the communications management device 26 electrically couples to the storage processor 24, the controller 50 detects a configuration characteristic 58-1 indicating that the storage array 22 is configured as part of the SAN. Detection of the configuration characteristic 58-1 can occur in a number of ways. In one arrangement, the controller 50 receives the configuration characteristic 58-1 as an electric signal from the storage processor 24 via the bus 56 where the signal identifies the SAN configuration of the storage array 22. In another arrangement, the controller 50 is configured or encoded with the configuration characteristic 58-1 as a default. As such, upon electrical coupling to the storage processor 24, the controller 50 automatically detects the SAN configuration of the storage array 22.

As a result of detecting the storage array 22 being part of the SAN, the controller 50 configures the switch 36 to provide isolated communications paths between the first and second ports 32, 34 of the communications management device 26 and the management and service ports 28, 30 of the storage processor 24, respectively. For example, as illustrated in FIG. 4, the controller 50 configures a VLAN of the switch 26 to establish a first isolated communications path 42 on the switch 36 for communications between the first port 32 and the management port 28 and to establish a second isolated communications path 44 on the switch 36 for communications between the second port 34 and the service port 30. As such, the controller 50 isolates the ports 32, 34 to minimize or prevent interaction or communication between a user device 31 coupled to the first port and a service device 33 coupled to the second port 34.

Figure 5:
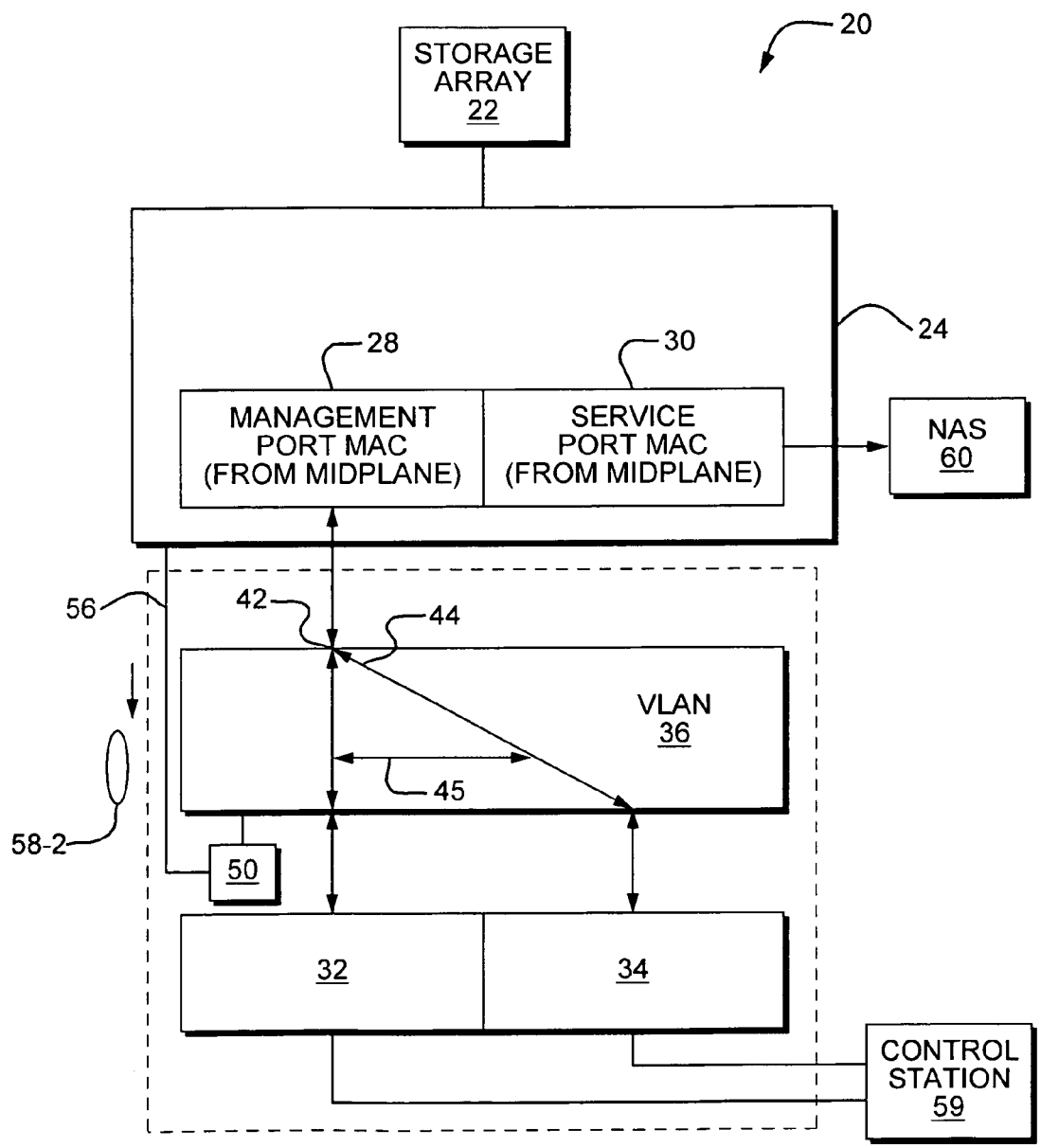
FIG. 5 illustrates a configuration of the communication management device of FIG. 3 when the storage array includes a network attached storage (NAS) device, according to one embodiment of the invention.

FIG. 5 illustrates another arrangement of the data storage system 20 where the storage array 22 is configured to include a NAS device 60. With such a configuration, the storage processor 24 and storage array 22 are connected between a control station 59 (e.g., a device configured to provide connection of one or more user devices 31) and the NAS device 60 in a "daisy chain" configuration. As a result, one port 28 of the storage processor 24 is required to provide the control station 59 with access to the storage array 22 while the other port 30 of the storage processor 24 is required to provide the NAS device 60 with access to the storage array 22.

In such an arrangement, when the communications management device 26 electrically couples to the storage processor 24, the controller 50 detects a configuration characteristic 58-2 indicating that the storage array 22 includes a NAS device 60. For example, upon electrical coupling of the communications management device 26 to the storage processor 24, the controller 50 receives the configuration characteristic 58-2, such as an electric signal, from the storage processor 24 via the bus 56. Based upon the configuration characteristic 58-2, the controller 50 configures the switch 50 such that communications from the first and second ports 32, 34 are directed to the management port 28 on the storage processor 24. As such, the controller 50 disables communications between the first and second ports 32, 34 and the service port 30, thereby allowing the service port 60 to connect to the NAS device 60 to allow data communication between the NAS device 60 and the storage array 22.

As indicated in FIG. 5, when the controller 50 configures a VLAN of the switch 50 the controller 50 establishes a first isolated communications path 42 on the switch 36 for communications between the first port 32 of the device 26 and the management port 28 and establishes a second isolated communications path 44 on the switch 36 for communications between the second port 34 of the device 26 and the management port 34. However, in this arrangement, because a single control station 59, as opposed to a user device 31 and service device 33, couples to the first and second ports 32, 34, the control station 59 can require intercommunication between the first and second ports 32, 34. In one arrangement, when the controller 50 establishes the first and second communications paths 42, 44 on the switch 36, the controller also establishes a third communications path 45 between the first and second isolated communications paths 42, 44 to provide communications between the ports 32, 34 and allow data transfer therebetween.

As indicated with respect to FIGS. 1, 4, and 5, the data storage system 20 includes a storage array 22 having a single storage processor 24 that is coupled to a single communications management device 26. However, in an arrangement shown in FIGS. 6A and 6B, the data storage system 20 includes multiple storage processors and multiple communications management devices to provide failover redundancy in the system 20.

Figure 6A:
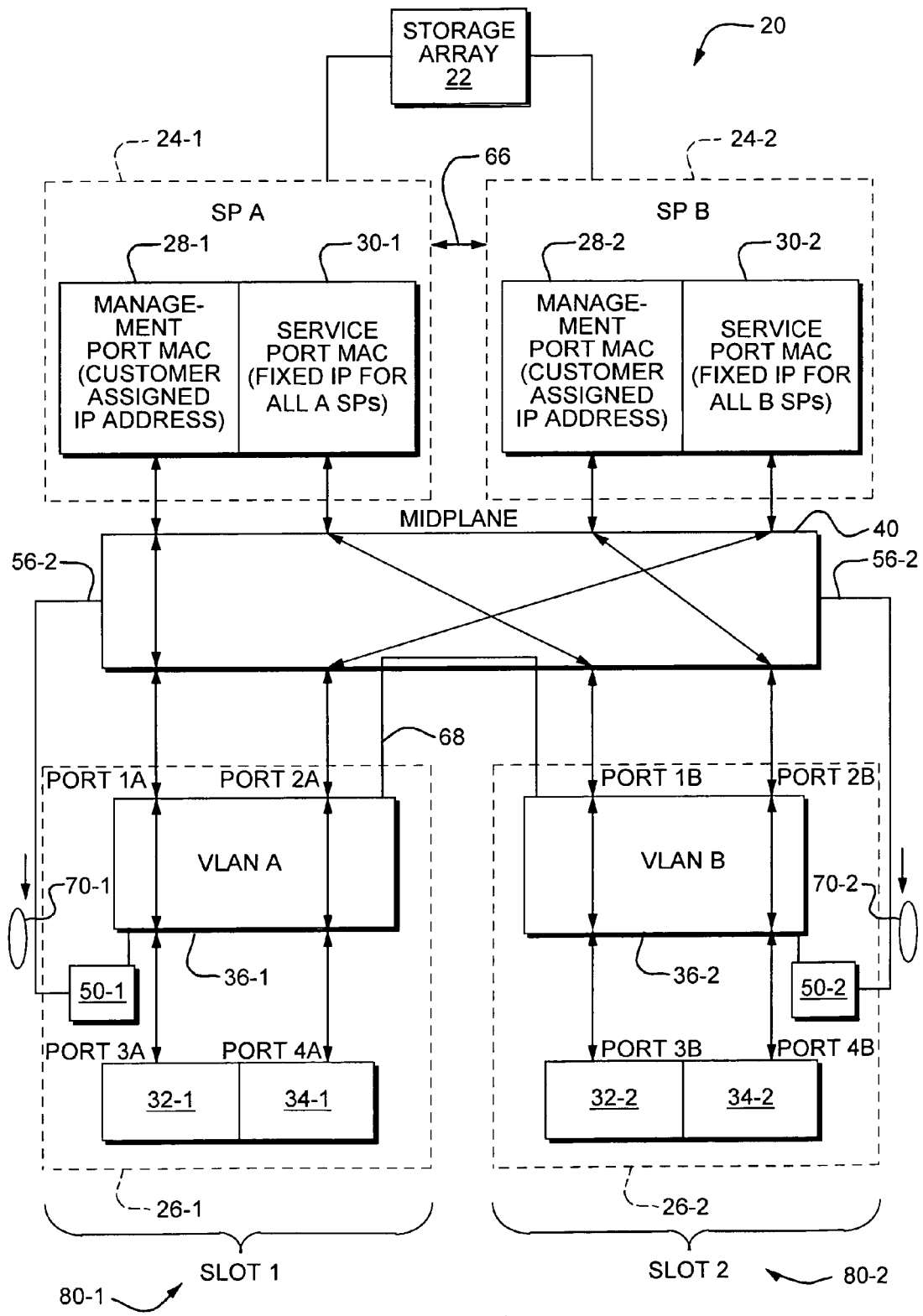
FIG. 6A illustrates a configuration of the data storage system having redundant communication management devices.
Figure 6B:
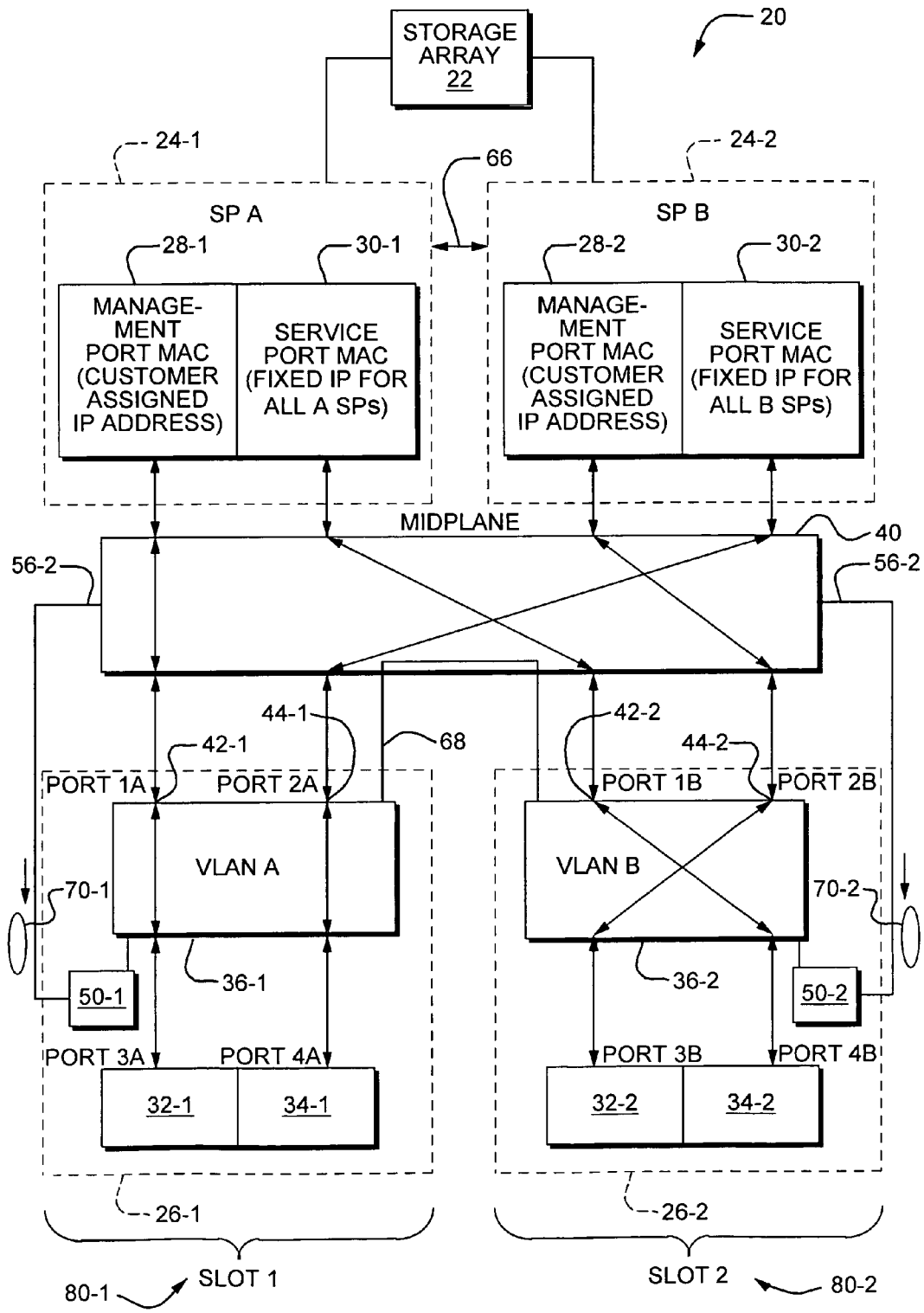
FIG. 6B illustrates a configuration of the data storage system of FIG. 6A having switches configured to provide communication between the ports of the redundant communication management devices and the ports of the redundant storage processors of the data storage system, according to one embodiment of the invention.

In FIGS. 6A and 6B, the data storage system 20 includes first and second storage processors 24-1, 24-1 interconnected with first and second communications management devices 26-1, 26-2 by the midplane 40. Each of the first and second communications management devices 26-1, 26-2 are configured as a field replaceable units (FRU) that can be electrically coupled to, or decoupled from, the midplane 40. Additionally, the communications management devices 26-1, 26-2 are "hot swappable," allowing the devices 26-1, 26-2 to be decoupled from and recoupled to the midplane 40 during operation of the system 20 without affecting the operability of the system 20.

As indicated above, the system 20 shown in FIGS. 6A and 6B is configured to provide failover redundancy. For example, the data storage system 20 includes a connection 66, such as a Common Management Information (CMI) path, between the first and second storage processors 24-1, 24-1. Such a connection 66 allows continued operation of the system 20 in the event of failure of one of the communications management devices 26-1, 26-2. For example, assume the first communications management device 26-1 fails. In such a case, a user device 31 or a service device 33 coupled to the second communications management devices 26-2 can access either of the management ports 28-1, 28-2 or the service ports 30-1, 30-2, respectively, through the connection 66 to access the storage array 22.

The midplane 40 includes multiple locations or slots 80 for coupling of the communications management devices 26 to the storage processors 24. For example, the midplane 40 includes a first slot 80-1 that provides an electrical connection with the first communications management device 26-1 and a second slot 80-2 that provides an electrical connection with the second communications management device 26-1. The midplane 40 is further configured, such as by a hard wiring scheme, to provide data communication between the first port 32-1, 32-2 of each device 26-1, 26-2 and the first service processor 24-1 and between the second port 34-1, 34-2 of each device 26-1, 26-2 and the second service processor 24-1. For example, as shown in FIG. 6A, the midplane 40 provides electrical coupling between the first port 32-1 of device 26-1 and the management port 28-1 of the first storage processor 24-1, between the second port 34-1 of device 26-1 and the service port 30-2 of the second storage processor 24-2, between the first port 32-2 of device 26-2 and the service port 30-1 of the first processor 24-1, and between the second port 34-2 of the second device 26-2 and the management port 28-2 of the second storage processor 24-2. Such a connection scheme provides failover redundancy in the system 20 to allow a user device 31 or service device 33 to access the storage array 22 from either of the communications management devices 26-1, 26-2.

In one arrangement, the locations of the first and second ports 32, 34 on each of the devices 26-1, 26-2 are "fixed" relative to each other. For example, as illustrated in FIG. 1, the first port 32 is disposed on the communications management device 26 in a fixed location that is above the second port 34. In such an arrangement, when the communications management devices 26-1, 26-2 are coupled to the respective slots 80-1, 80-2, the wiring configuration of the midplane 40 effectively "swaps" or reverses the functionality of the ports 34, 34. For example, returning to FIG. 6, when a communications management device 26 is inserted into the first slot 80-1, the first or top port 32-1 electrically couples to a management port 28 while the second or bottom port 34-1 electrically couples to a service port 30 and when a communications management device 26 is inserted into the second slot 80-2, the first or top port 32-2 electrically couples to a service port 30 while the second or bottom port 34-2 electrically couples to a management port 30.

In order to provide consistency between the relative location of a port (e.g., top or bottom) and its functionality (e.g., to provide communication with either a management port or a service port), in one arrangement, the communications management device 26 is operable to configure the topology of the switch 56 based upon the location or slot 80 into which the communications management device 26 is inserted. For example, as shown in FIG. 6A, the system 20 provides the communications management device 26 with a coupling characteristic 70 that indicates to the controller 50 the slot or location 50 of the communications management device 26 relative to the midplane 40. In one arrangement, the coupling characteristic 70 is configured as a bit code signal delivered to the communications management device 26 by the midplane 40. Based upon the coupling characteristic 70 received, the controller 50 configures the network topology of the switch 36 in a particular arrangement.

For example, as indicated in FIG. 6B, when the communications management device 26-1 electrically couples to the midplane 40 in the first slot 80-1, the controller 50-1 receives a coupling characteristic 70-1, such as the bit code "01", from the midplane 40 via bus 56-1, which informs the controller 50 as to the location 80-1 of the device 26-1. Based upon the coupling characteristic 70-1, the controller 50 configures the VLAN of the switch 36-1 to establish a first communications path 42-1 between the top port 32-1 of the communications management device 26-1 and the management port 28-1 and to establish a second communications path 44-1 between the bottom port 34-1 of the communications management device 26-1 and the service port 30-2.

Also as illustrated in FIG. 6B, when the communications management device 26-2 electrically couples to the midplane 40 in the second slot 80-2, the controller 50-2 receives a coupling characteristic 70-2, such as the bit code "10", from the midplane 40 via bus 56-2, which informs the controller 50-2 as to the location 80-2 of the device 26-2. Based upon the coupling characteristic 70-2, the controller 50-2 configures the VLAN of the switch 36-2 to establish a first communications path 42-2 between the top port 32-2 of the communications management device 26-2 and the management port 28-2 and to establish a second communications path 44-2 between the bottom port 34-2 of the communications management device 26-2 and the service port 30-1. With such a configuration, a user device 31 can always couple to the top port 32 on either communications management device 26-1, 26-2 to access the storage array 22 and a service device can always couple to the bottom port 34 on either communications management device 26-1, 26-2 to access the storage array 22. The use of the coupling characteristic 70 to configure the switch 70, therefore, minimizes or limits potential user confusion when attaching an electronic device (e.g., user device or service device) to the storage array 22.

While this invention has been particularly shown and described with references to preferred embodiments thereof, it will be understood by those skilled in the art that various changes in form and details may be made therein without departing from the spirit and scope of the invention as defined by the appended claims.

For example, as indicated above with respect to FIG. 3, the configuration characteristic 58 indicates, to the communications management device 26, a configuration of the storage array 22. For example, the storage array 22 can be configured as a storage area network (SAN) or can be configured to include a network attached storage (NAS) device, such as a gateway or a server, which forms a front-end to the storage array 22. The configuration characteristic 58 indicates to the controller 50 the "type" of storage array 22 to which the device 26 is connected, either a SAN or a NAS device. Such description is by way of example only. While the configuration characteristic 58 can indicate connection to a either a SAN or a NAS device, the configuration characteristic 58 can indicate connection of the communications management device 26 to other types of storage arrays as well.

In another example, as illustrated in FIGS. 6A and 6B, the data storage system includes two storage processors 24-1, 24-1 and two communications management devices 26-1, 26-1 to provide failover redundancy in the system 20. Such illustration is by way of example only. In one arrangement, more than two storage processors 24-1, 24-1 and two communications management devices 26-1, 26-1 can be used to provide failover redundancy.

In another example, as illustrated in FIGS. 6A and 6B, each communications management device 26-1, 26-2 receives connection information 70-1, 70-2 from the midplane 40. Such illustration is by way of example only. In one arrangement, each communications management device 26-1, 26-2 receives the connection information from one or both of the storage processors 24-1, 24-2. For example, the first communications management device 26-1 can receive connection information 70-1 from the first storage processor 24-1 and the second communications management device 26-2 can receive connection information 70-2 from the second storage processor 24-2.

In another example, as indicated above with respect to FIGS. 6A and 6B, the midplane 40 is configured (e.g. hard wired) to provide electrical coupling between the ports 32, 34 of the communications management device 26 and the ports 28, 30 of the storage processor 24. Such description is by way of example only. In one arrangement, the midplane 40 includes a communications management device connection 68 that allows electrically couples the switches 36-1, 36-2 of the communications management devices 26-1, 26-2. Such an arrangement, for example, allows a service device 33 to access either the first service port 30-1 or the second service port 30-2 from either of the communications management devices 26-1, 26-2. For example, in the case where the service device 33 electrically couples to the port 34-1 of the first communications management device 26-1, the service device 33 can access the first service port 30-1 through the first switch 36-1 and can access the second service port 30-2 through the second switch 36-2 via the communications management device connection 68.

What is claimed is:

1. In a communications management device, a method of forming a communication pathway with a storage array, comprising:
    connecting a midplane connector of a switch of the communications management device with a management port and a service port of a storage processor of the storage array via a midplane, the management port configured to provide a first device with access to the storage array and the service port configured to provide a second device with access to the storage array;
    detecting a configuration characteristic associated with the storage array, the configuration characteristic consisting of the storage array being configured as part of a storage area network (SAN) or the storage array being configured as part of a network attached storage (NAS) system;
    based on the detected configuration characteristic, configuring a first virtual local area network (VLAN) of the switch to establish a first communications path of the switch and configuring a second VLAN of the switch to establish a second communications path of the switch, the first communications path being isolated from the second communications path; and
    conveying data between (i) a first port of the communications management device and at least one of the management port and the service port of the storage processor, via the midplane connector, using the first communications path and (ii) a second port of the communications management device and at least one of the management port and the service port of the storage processor, via the midplane connector, using the second communications path, the midplane connector being distinct from the first port of the communications management device and from the second port of the communications management device;
    wherein configuring the first VLAN of the switch to establish the first communications path of the switch and configuring the second VLAN of the switch to establish the second communications path of the switch comprises configuring the first VLAN through the switch to logically partition the switch into a first isolated communications path between the first port and the midplane connector of the switch and at least one of the management port and the service port of the storage processor and configuring the second VLAN through the switch to logically partition the switch into a second isolated communications path between the second port and the midplane connector of the switch and at least one of the management port and the service port of the storage processor, the first isolated communications path being distinct from the second isolated communications path;
    wherein when the detected configuration characteristic indicates the storage array is configured as part of the SAN, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the service port of the storage processor, the first communications path being isolated from the second communications path; and
    wherein when the detected configuration characteristic indicates the storage array is configured as part of the NAS system, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the management port of the storage processor, the first communications path being isolated from the second communications path; and
    wherein the storage processor is configured to provide load and store operations, relative to the storage array, via the management port on behalf of the first device, the first device configured as a user device disposed in electrical communication with the first port of the communications management device and the storage processor is configured to provide diagnostic and service operations, relative to the storage array, via the service port on behalf of the second device disposed in electrical communication with the second port of the communications management device, the second device configured as a service device.

2. The method of claim 1, further comprising establishing a communications management device connection between the switch of the communications management device and a second switch associated with a second communications management device electrically coupled to the storage array.

3. The method of claim 1, wherein connecting the switch of the communications management device with the storage processor of the storage array, the storage processor having the management port and the service port, the management port configured to provide the first device with access to the storage array and the service port configured to provide the second device with access to the storage array comprises connecting the switch of the communications management device with the storage processor of the storage array, the storage processor having the management port and the service port, the storage processor being configured to provide load and store operations, relative to the storage array, via the management port on behalf of a user device disposed in electrical communication with the first port of the communications management device and the storage processor being configured to provide diagnostic and service operations, relative to the storage array, via the service port on behalf of a service device disposed in electrical communication with the second port of the communications management device.

4. The method of claim 3, wherein logically partitioning the switch into a first isolated communications path between the first port and the midplane connector of the switch and at least one of the management port and the service port of the storage processor and into a second isolated communications path between the second port and the midplane connector of the switch and at least one of the management port and the service port of the storage processor includes isolating interaction of the service device, as disposed in electrical communication with the second port of the communications management device, with the user device, as disposed in electrical communication with the first port of the communications management device and includes isolating interaction of the user device, as disposed in electrical communication with the first port of the communications management device, with the service device, as disposed in electrical communication with the second port of the communications management device.

5. The method of claim 1, wherein the controller is further electrically coupled to the storage processor via a bus; wherein detecting the configuration characteristic associated with the storage array includes receiving, by the controller, an electrical signal from the storage processor over the bus, the electrical signal identifying the configuration characteristic associated with the storage array.

6. A communications management device, comprising:
  a first port, a second port, a switch electrically coupled to the first port and the second port, a midplane connector electrically coupled to the switch, and a controller electrically coupled to the switch, the controller configured to:
    connect the switch of the communications management device, via the midplane connector, with a management port and a service port of a storage processor of the storage array, the management port configured to provide a first device with access to the storage array and the service port configured to provide a second device with access to the storage array;
    detect a configuration characteristic associated with the storage array, the configuration characteristic consisting of the storage array being configured as part of a storage area network (SAN) or the storage array being configured as part of a network attached storage (NAS) system;
    based on the detected configuration characteristic, configure a first virtual local area network (VLAN) of the switch to establish a first communications path of the switch and configure a second VLAN of the switch to establish a second communications path of the switch, the first communications path being isolated from the second communications path, the first communications path operable to convey data between the first port of the communications management device and at least one of the management port and the service port of the storage processor via the midplane connector, and the second communications path operable to convey data between the second port of the communications management device and at least one of the management port and the service port of the storage processor via the midplane connector, the midplane connector being distinct from the first port of the communications management device and from the second port of the communications management device;
  wherein configuring the first VLAN of the switch to establish the first communications path of the switch and configuring the second VLAN of the switch to establish the second communications path of the switch comprises configuring the first VLAN through the switch to logically partition the switch into a first isolated communications path between the first port and the midplane connector of the switch and at least one of the management port and the service port of the storage processor and configuring the second VLAN through the switch to logically partition the switch into a second isolated communications path between the second port and the midplane connector of the switch and at least one of the management port and the service port of the storage processor, the first isolated communications path being distinct from the second isolated communications path; and
  wherein when the controller detects, as the configuration characteristic, that the storage array is configured as a part of the SAN, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the service port of the storage processor, the first communications path being isolated from the second communications path; and
  wherein when the controller detects, as the configuration characteristic, that the storage array is configured as a part of the NAS system, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the management port of the storage processor, the first communications path being isolated from the second communications path; and
  wherein the storage processor is configured to provide load and store operations, relative to the storage array, via the management port on behalf of the first device, the first device configured as a user device disposed in electrical communication with the first port of the communications management device and the storage processor is configured to provide diagnostic and service operations, relative to the storage array, via the service port on behalf of the second device disposed in electrical communication with the second port of the communications management device, the second device configured as a service device.

7. The communications management device of claim 6, wherein the switch of the communications management device is configured to electrically couple with a second switch associated with a second communications management device electrically coupled to the storage array via a communications management device connection.

8. The communications management device of claim 6, wherein the controller is further electrically coupled to the storage processor via a bus; wherein detecting the configuration characteristic associated with the storage array includes receiving, by the controller, an electrical signal from the storage processor over the bus, the electrical signal identifying the configuration characteristic associated with the storage array.

9. A data storage system, comprising:
a storage array having a storage processor, the storage processor having a management port and a service port, the management port configured to provide a first device with access to the storage array and the service port configured to provide a second device with access to the storage array; and
a communications management device, having a first port, a second port, a switch electrically coupled to the first port and the second port, a midplane connector electrically coupled to the switch, and a controller electrically coupled to the switch, the controller configured to:
connect the switch of the communications management device, via the midplane connector, with the management port and the service port of the storage processor of the storage array;
detect a configuration characteristic associated with the storage array, the configuration characteristic consisting of the storage array being configured as part of a storage area network (SAN) or the storage array being configured as part of a network attached storage (NAS) system;
based on the detected configuration characteristic, configure a first virtual local area network (VLAN) of the switch to establish a first communications path of the switch and configuring a second VLAN of the switch to establish a second communications path of the switch, the first communications path being isolated from the second communications path, the first communications path operable to convey data between the first port of the communications management device and at least one of the management port and the service port of the storage processor via the midplane connector, and the second communications path operable to convey data between the second port of the communications management device and at least one of the management port and the service port of the storage processor via the midplane connector, the midplane connector being distinct from the first port of the communications management device and from the second port of the communications management device;
wherein configuring the first VLAN of the switch to establish the first communications path of the switch and configuring the second VLAN of the switch to establish the second communications path of the switch comprises configuring the first VLAN through the switch to logically partition the switch into a first isolated communications path between the first port and the midplane connector of the switch and at least one of the management port and the service port of the storage processor and configuring the second VLAN through the switch to logically partition the switch into a second isolated communications path between the second port and the midplane connector of the switch and at least one of the management port and the service port of the storage processor, the first isolated communications path being distinct from the second isolated communications path; and
wherein when the controller detects, as the configuration characteristic, that the storage array is configured as a part of the SAN, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the service port of the storage processor, the first communications path being isolated from the second communications path; and
wherein when the controller detects, as the configuration characteristic, that the storage array is configured as a part of the NAS system, the configuring of the first and second VLANs of the switch further comprises configuring the first VLAN of the switch to establish the first communications path of the switch between the first port of the communications management device and the management port of the storage processor and configuring the second VLAN of the switch to establish the second communications path of the switch between the second port of the communications management device and the management port of the storage processor, the first communications path being isolated from the second communications path; and
wherein the storage processor is configured to provide load and store operations, relative to the storage array, via the management port on behalf of the first device, the first device configured as a user device disposed in electrical communication with the first port of the communications management device and the storage processor is configured to provide diagnostic and service operations, relative to the storage array, via the service port on behalf of the second device disposed in electrical communication with the second port of the communications management device, the second device configured as a service device.

10. The data storage system of claim 9, wherein the storage array system is configured to from a communications management device connection between the switch of the communications management device and a second switch of a second communications management device electrically coupled to the storage array.

11. The data storage system of claim 9, wherein the controller is further electrically coupled to the storage processor via a bus; wherein detecting the configuration characteristic associated with the storage array includes receiving, by the controller, an electrical signal from the storage processor over the bus, the electrical signal identifying the configuration characteristic associated with the storage array.

* * * * *